H. D. WEED.
ANTISKIDDING GRIP TREAD.
APPLICATION FILED FEB. 24, 1908.
1,051,472.
Patented Jan. 28, 1913.
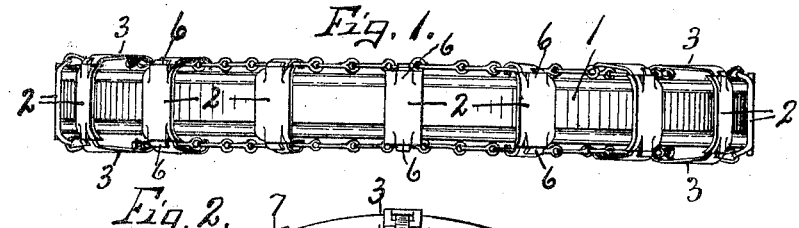
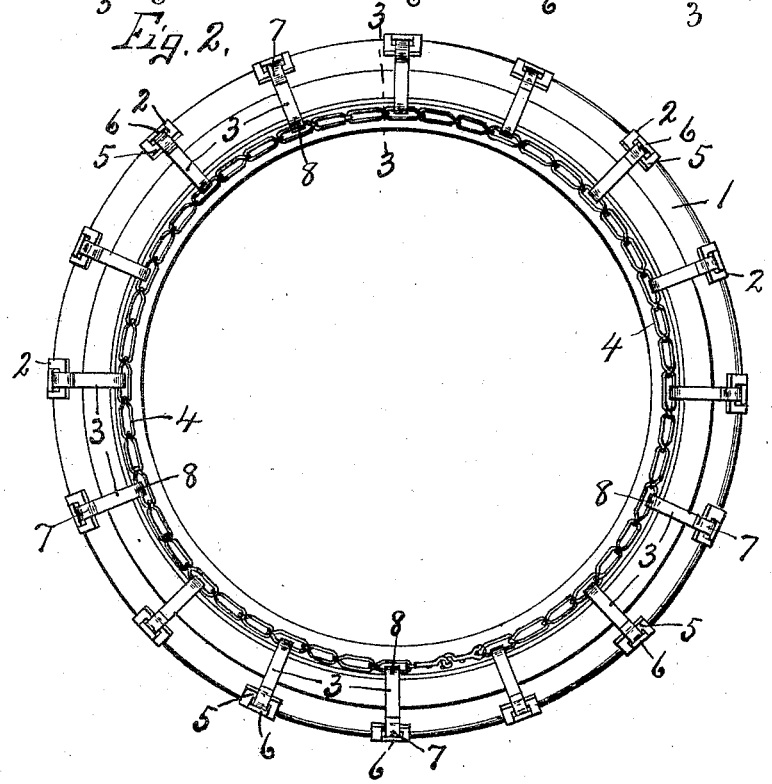
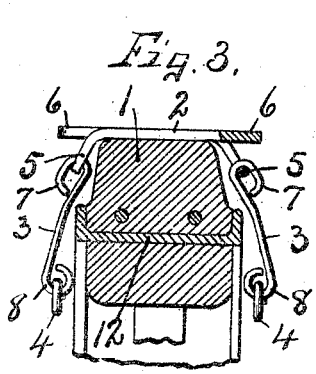
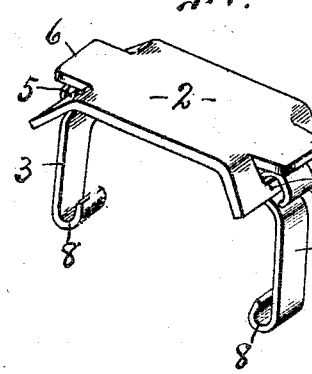
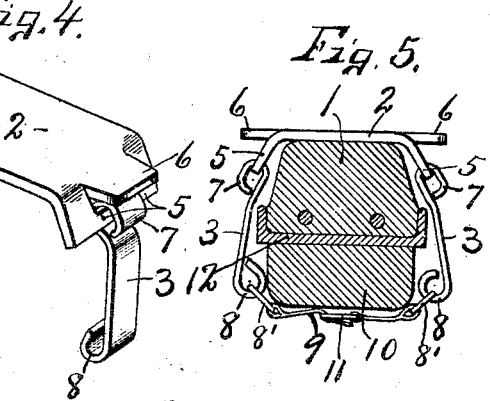
Witnesses.
Inventor.
H. D. Weed
By
Howard P. Denison
Attorney.

UNITED STATES PATENT OFFICE.

HARRY D. WEED, OF SYRACUSE, NEW YORK.

ANTISKIDDING GRIP-TREAD.

1,051,472.   Specification of Letters Patent.   Patented Jan. 28, 1913.

Application filed February 24, 1908. Serial No. 417,441.

*To all whom it may concern:*

Be it known that I, HARRY D. WEED, of Syracuse, in the county of Onondaga, in the State of New York, have invented new and useful Improvements in Antiskidding Grip-Treads, of which the following, taken in connection with the accompanying drawings, is a full, clear, and exact description.

This invention relates to certain improvements in anti-skidding grip treads for vehicle tires and is especially adapted for use in connection with solid rubber tires which are commonly employed for auto trucks and other heavy self-propelled vehicles.

The gripping or wearing elements are arranged in circumferential series around and upon the tread of the tire and are held in operative position by suitable attaching elements which together with the wearing elements are subjected to irregular and heavy strains in all directions in passing over obstructions and uneven pavements and particularly when passing diagonally or otherwise across or over street car tracks where the pavements and portions of the rails are always more or less depressed. Unless these attaching elements are protected in some manner against undue wear and shearing strains either by contact with the pavement, rail or other obstacle or by impinging some part of the attaching elements between said rail or other obstacle and rim of wheel, there is always more or less liability of shearing the attaching elements in two and thereby destroying the retaining means for the wearing plates.

My main object, therefore, is to make the gripping and attaching elements of highly tenacious and durable metal capable of withstanding the severe strains to which they are subjected and to protect the attaching elements so far as practical against excessive shearing and other strains and also against undue wear by shielding them from contact with the pavement and obstacles with which they would be liable to come in contact.

A further object is to make the attaching elements rigid or continuous across the edges of the rim of the wheel so as to better resist shearing strains between the rails or other obstacles and said rim.

A still further object is to provide a limited play or freedom of action of the wearing plates relative to the attaching elements so as to further relieve the latter from excessive strains, the general purpose being to preserve the integrity and holding efficiency of the grip tread or armor as a whole.

Other objects and uses will be brought out in the following description.

In the drawings—Figures 1 and 2 are respectively a top plan and a side view of my improved anti-skidding grip tread as applied to the solid tire of a vehicle wheel. Fig. 3 is an enlarged transverse sectional view taken on line 3—3, Fig. 2. Fig. 4 is a perspective view of one of the detached tread plates and attaching elements therefor. Fig. 5 is a sectional view similar to Fig. 3 showing a modified form of attaching element.

In order to clearly demonstrate the practicability of my invention I have shown it as applied to a solid rubber tire —1— and as consisting of a series of substantially flat metal plates —2— arranged in circular series a suitable distance apart around and upon the periphery of the tire and held in place by attaching elements —3— and opposite circular side pieces —4—, the latter being located at opposite sides of and within the periphery of the tire while the attaching elements —3— for each plate are also located at opposite sides of the tire and serve as connections between the circular side pieces and adjacent ends of the plates. The outer faces of these solid rubber tires are usually flat transversely and the intermediate portions of the plates which rest upon the periphery of the tire are also flat transversely and circumferentially but their opposite ends which extend some distance beyond the opposite sides of the tires are formed with U-shaped slits therethrough forming loops —5— and tongues —6—, the loops —5— being depressed inwardly toward the center of the wheel beyond the tongues —6— which remain in the same plane as the intermediate portion of the plate.

The inner ends of the slits forming the groove —5— and tongue —6— terminate near the opposite edges of the periphery of the tire thus bringing the bend of the loops close to said edges so that when the loops are depressed inwardly in the manner just described they serve the double purpose of retaining the plates against undue lateral movement upon the periphery of the tire and also leave sufficient clearance between the loops —5— and tongues —6— for the reception and limited play of the adjacent attaching elements —3— as best seen in Figs. 3 and 4.

It is evident from the foregoing description that by bending the loops inwardly toward each other and toward the sides of the tire while the tongues —6— remain in the same plane as the intermediate portion of the plate, the attaching ends of the loops are brought within the planes of the outer edges of the tongues and also within the circumferential plane of the plates or periphery of the tire so that the adjacent ends of the attaching elements are protected from wear by the tongues —6— which overhang said attaching ends and thereby serve as shields to protect the attaching elements from contact with the pavement or obstacles over which the wheel passes and at the same time the laterally projecting ends of the tongues —6— serve as biting or gripping edges to prevent lateral skidding or slipping of the wheels when in action, while the intermediate portion of the plate as well as the front and rear edges of the tongues serve to grip the pavement with greater firmness to aid in propelling the vehicle and preventing undue lateral swerving of the rear end of the vehicle in traveling down grades such as steep inclines where the pavement may be more or less slippery from mud, ice or snow.

In Figs. 1 to 4 inclusive, I have shown the attaching elements —3— as consisting of metal links, one pair for each plate, each link being provided at its opposite ends with hooks or eyes —7— and —8— which are hooked into the adjacent loop —5— and into one of the circular side pieces respectively. The circular side pieces —4— may be made of any suitable flexible material such as cables or chains which connect the attaching elements —3— at the adjacent side of the wheel and are usually divided at some point in their length and provided with suitable attaching elements as snap hooks by means of which the entire grip tread may be readily attached to or removed from the tire at will. In some instances, however, I may desire to hold each plate in place by an individual attaching element and for this purpose, I have shown in Fig. 5, one of the plates as held upon the periphery of the tire by means of a strap —9— having its opposite ends attached to links —8'— on the inner ends of the parts —3— and its intermediate portion drawn under the rim as —10— of the wheel and provided with a suitable buckle —11— whereby the plate may be readily applied to or removed from the tire.

In the device shown in Figs. 1 to 3 inclusive, the entire grip tread including the plates —2—, attaching elements —3—, and circular side pieces —4— are free to creep or shift position relatively to the tire which prevents in a measure the plates from embedding themselves into and unduly wearing the tire at any particular point and also enables the plates to better adjust themselves to any inequalities in the pavement at the tread of the tire to afford a better grip upon the pavement. The eyes —7— and loops —5— with which they are interlocked are elongated in the direction of the length of the attaching elements to allow a limited radial play of the wearing plates and attaching elements relatively to each other or rather to allow a limited degree of radial movement of the wearing plates independently of the attaching elements when in action to relieve said attaching elements from excessive strains as would be the case if the connection between the attaching elements and plate were rigid, it being understood that an open space is left between the inner faces of the plates and adjacent ends of the attaching elements for this purpose.

As best seen in Figs. 2, 3 and 5, the attaching elements —3— consist of continuous rigid bars or links extending from the loops —5— inwardly across the edges of the rim as —12— of the wheel and this rigidity or continuity of the attaching elements enables them to encounter or contact with obstacles such as rails and the like under a glancing impact which prevents shearing of such elements between said obstacles and rim of the wheel as would be more liable to be the case if the attaching elements were made of jointed parts or flexible between their points of attachment with the wearing plates and circular side pieces. One of the eyes as the inner eye, of each of the attaching elements at one or both sides of the wheel may be left open as shown in Fig. 3 to permit such attaching elements to be readily detached from or attached to the adjacent circular side piece.

It will be seen from the foregoing description that the essential purposes of my invention are: 1st, to protect the attaching elements from undue wear by shields which extend beyond and overhang the adjacent ends of such attaching elements; 2nd, to make the attaching elements continuous and rigid across the edges of the rim of the wheel between their points of attachment with the wearing plate and side pieces for the purpose of affording glancing impact with the rails and other obstacles with which they may be brought into contact and thereby avoiding liability of shearing such elements between the rail or other obstacle and rim of the wheel, and 3rd, to allow a limited radial play or freedom of action of the wearing plates relatively to their attaching elements so as to relieve said attaching elements from undue strains and permit the wearing plates to conform to uneven surfaces over which they pass.

What I claim is:

1. In a grip tread for tires, a tread plate having its opposite ends provided with U-shaped slits, the portions at the outside of the slits being depressed inwardly to form loops, and attaching members connected to said loops.

2. In a grip tread for tires, a series of flat plates arranged circumferentially around and upon the periphery of the tire, each plate having its opposite ends provided with U-shaped slits forming intervening tongues between the slits, the portions of the plates at the outside being depressed inwardly beyond the intervening portions to form loops and attaching members connected to said loops said tongues being disposed in the same plane as the main bodies of their plates and across the outer ends of the attaching elements but apart therefrom.

3. In a grip tread for tires, a series of plates arranged circumferentially around and upon the periphery of the tire and having their opposite sides provided with laterally projecting tongues and loops depressed within the planes of the tongues, and attaching members having elongated slots in which the loops are inserted.

4. In combination with the rim and tire of a vehicle wheel, a series of tread plates arranged circumferentially around and upon the periphery of the tire and having their opposite sides provided with laterally projecting tongues and loops extending laterally and inwardly from the base of the tongues, and attaching members connected to said loops.

5. In combination with the rim and tire of a vehicle wheel, a series of plates arranged circumferentially around and upon the periphery of the tire and having their opposite sides provided with laterally projecting tongues and loops deflected inwardly beyond the planes of their corresponding tongues, attaching members having radially elongated eyes connected to said loops to permit relative radial movement of the plates and attaching members, and circular side pieces connecting the inner ends of the attaching members.

In witness whereof I have hereunto set my hand this 19th day of February 1908.

HARRY D. WEED.

Witnesses:
 H. E. CHASE,
 C. M. McCORMACK.

---

Copies of this patent may be obtained for five cents each, by addressing the "Commissioner of Patents, Washington, D. C."